INVENTOR
ART LEE
BY
David M. Schiller
ATTORNEY

FIG.2

| CONDITION | LIGHTS | | HORN | RELAY WINDINGS | | | | | | | | | | | | |
|---|---|---|---|---|---|---|---|---|---|---|---|---|---|---|---|---|
| | | | | N.O. ALARM CONTACT | | N.C. ALARM CONTACT | | | | | | N.O. ALARM CONTACT | | N.C. ALARM CONTACT | | |
| | 14 | 14' | | 1C | 2C | 1C | 2C | 1A | 1B | 2B | 1C' | 2C' | 1C' | 2C' | 1A' | 1B' | 2B' |
| NORMAL | OFF | OFF | OFF | D | E | D | E | D | E | D | D | E | D | E | D | E | D |
| FIRST ABNORMAL | FLASH | OFF | ON | E | E | D | D | E | E | D | E | E | D | E | D | E | E |
| SUBSEQUENT ABNORMAL | FLASH | STEADY | ON | E | E | D | D | E | E | D | E | E | D | D | E | D | D |
| ACKNOWLEDGE | STEADY | STEADY | OFF | E | E | D | D | D | D | D | E | E | D | D | E | D | D |
| RETURN TO NORMAL | OFF | OFF | OFF | D | E | D | E | E | E | D | D | E | D | E | D | E | D |
| FUNCTION TEST (EACH MODULE ALONE) | FLASH | FLASH | ON | D | E | D | E | E | E | D | D | E | D | E | E | E | D |

INVENTOR.
ART LEE

BY
David M. Schiller
ATTORNEY

Oct. 27, 1970     A. LEE     3,537,089

ANNUNCIATOR MODULES AND SYSTEMS

Filed Oct. 30, 1967     3 Sheets-Sheet 3

INVENTOR.
ART LEE

BY
David M. Schiller

ATTORNEY

United States Patent Office 3,537,089
Patented Oct. 27, 1970

3,537,089
ANNUNCIATOR MODULES AND SYSTEMS
Art Lee, Bloomington, Ill., assignor to General Electric
Company, a corporation of New York
Filed Oct. 30, 1967, Ser. No. 678,913
Int. Cl. G08b 23/00
U.S. Cl. 340—213.1                           25 Claims

ABSTRACT OF THE DISCLOSURE

An annunciator module adapted for selective operation with either a normally open or a normally closed alarm contact for indicating the condition of a variable includes a first relay having two oppositely poled windings each energized through a separate pair of terminals with one pair of terminals adapted for association with a normally open alarm contact and the other pair of terminals for association with a normally closed alarm contact. When a normally open alarm contact is used, the other terminals are connected by a removable conductive link. The module includes a second relay controlled by the first relay, and a third relay controlled by the second relay, the second and third relays having respectively a single winding and a pair of oppositely poled windings. The second and third relays control alarm means including an indicating light which is adapted for connection to a power source independent of the main power source for the module. A grouping terminal is in circuit with one winding of the third relay for connection to like grouping terminals of other annunciator modules associated with a number of interrelated variables to provide a first and subsequent off normal sequence indicating system. A function test switch controls the second relay to permit a function test of the second and third relays and the alarm means, an optional holding circuit controls the second relay to permit provision of a memory or non-memory system as desired, and the first relay controls user's external information circuits.

BACKGROUND OF THE INVENTION

Annunciator modules have been provided for indicating the condition of a variable such as pressure, temperature, etc., and have ordinarily included relay means responsive to a signal such as the position of an associated alarm contact which is movable in accord with the condition of the associated variable to actuate suitable alarm means when the variable deviates from a normal condition. In practice, one or more modules may be employed independently in association with one or more unrelated variables, or a number of modules may be utilized in cooperating relation in association with a group of interrelated variables. When employed with one or more unrelated variables, the modules function independently of one another usually in common with such elements as an audible alarm, an acknowledge switch and a light flashing circuit. When employed with a group of interrelated variables, the modules function dependently on one another and are interconnected by special circuits to provide a first alarm indication in the module associated with the first variable of the group which becomes abnormal and to provide a second different alarm indication in the other modules associated with those variables of the group which becomes abnormal subsequent to the first to become abnormail variable.

Heretofore, there has not been available a single basic annunciator module design practical for use either independently or dependently interconnected with other modules, and the practice has been to supply two distinct module designs for the two different applications. Those modules designed for use with interrelated variables to provide the first and subsequent off normal sequence indication have included special relay and alarm indicating light designs and associated circuits and also special acknowledgement, resetting and grouping circuits resulting in modules of considerable cost and bulk which preclude their use in the more elementary independent application. Accordingly, there is a great need for a basic annunciator module of compact and inexpensive design which can be employed either independently, or in grouped dependent relation with other modules to provide a sequence indicating system.

Further, prior art designs have made no provision for complete functional testing of the relay and alarm means of an annunciator module while the associated alarm contact is in its normal position. It is also desirable to provide for actuation of user's external information circuits to permit an indication of the condition of a variable independently of the alarm means. When such external circuits are employed, it is desirable that they remain undisturbed when a function test is being performed.

Attempts have previously been made to provide a single annunciator module design which can be used interchangeably with either a normally open or a normally closed alarm contact. However, these attempts generally have been unsatisfactory in that they have resulted in modules of complex, costly and inefficient design. There is thus a need for a basic annunciator module of simple, efficient and low cost design which is readily convertible for use with either a normally open or a normally closed alarm contact. Also, previous annunciator module designs have had no provision for permitting ready conversion of the module for use either as a memory module wherein a momentary deviation of the variable from normal is remembered, or a non-memory module wherein a momentary deviation is not remembered. Such a conversion feature is very desirable in many applications.

OBJECTS OF THE INVENTION

It is accordingly a primary object of the present invention to provide a novel and improved basic annunciator module which is practical for use either independently, or in grouped dependent relation with other modules to provide a sequence indicating system.

It is another object of the invention to provide a module according to the preceding object including compact and low cost magnetic reed switch control relays.

It is still another object of the invention to provide a novel and improved annunciator module with provision for permitting a complete functional test of the relays and alarm means of the module while the associated variable is in normal condition.

It is a further object of the invention to provide a novel and improved annunciator module having provision for controlling user's external information circuits to permit an indication of the condition of the associated variable independently of the alarm means.

It is still another object of the invention to provide a basic annunciator module having novel and improved means permitting selective use of the module in association either with a normally closed or a normally open alarm contact.

It is a still further object of the invention to provide a low cost and compact basic annunicator module readily convertible for use as either a memory or non-memory module.

It is another object of the invention to provide a novel and improved basic annunicator module containing a single indicating light device and associated control circuits adapted for connection to a power source independent of the main power source for the module.

SUMMARY OF THE INVENTION

In carrying out the invention in one preferred form a baic annunicator module is provided for indicating the condition of an associated variable and includes first, second, and third relays and a single indicating light device. The module is adapted for association with an external audible horn and the first and third relays each includes two oppositely poled windings and a plurality of contacts, the second relay having a single winding and a plurality of contacts. The two windings of each of the first and third relays are arranged to produce a first magnetic flux condition when either winding alone is energized and a second substantially zero resultant flux condition when both windings are simultaneously energized or are deenergized. An energizing circuit for one winding of the first relay includes first spaced terminals for association with a normally open alarm contact and an energizing circuit for the other winding of the first relay includes second spaced terminals for association with a normally closed alarm contact. The second terminals are connected by a removable electroconductive link when the first terminals are associated with a normally open alarm contact.

The arrangement is such that when either type of alarm contact is used and is in its normal condition, the winding of the first relay produce one flux condition to establish certain operating conditions of the associated contacts, and when the alarm contact is in its abnormal condition, the windings produce the other flux condition to establish opposite operating conditions of the associated contacts. Contacts of the first relay are included in energizing circuits for the winding of the second relay, contacts of the second relay are included in energizing circuits for both windings of the third relay, and contacts of the second and third relays are included in energizing circuits for the indicating light and horn. The first relay also includes contacts for controlling user's external information circuits to permit indication of the condition of the associated variable independently of the alarm light and horn. When the alarm contact goes off normal, the winding of the second relay and one winding only of the third relay are energized to cause the light to flash and the horn to sound, and a manually operable acknowledge switch is effective when actuated to deenergize the one winding of the third relay to change the flashing light indication to a steady light indication and to silence the horn. A manually operable function test switch is provided to permit energization of the winding of the second relay when the alarm contact is in its normal condition to permit a function test of the second and third relays and the light and horn without disturbing the user's external circuits. The light and its energizing circuits are adapted for connection to a power source independent of the main power source for the module.

To allow use of a member of modules as above described in cooperating relation in association with a group of interrelated variables, the energizing circuit for the other winding of the third relay includes a grouping terminal adapted for connection to like grouping terminals of other similar modules. When the grouping terminals are interconnected, a first to become aboral variable results in a first alarm indication in the associated module, and the grouping connections cause energization of both windings of the third relay in each of the other modules to effect a different alarm indication in such other modules in response to their associtaed variables subsequently becoming abnormal.

Other objects and advantages of the invention will become apparent from the following description taken in conjunction with the accompanying drawings in which:

BRIEF DESCRIPTION OF THE DRAWINGS

FIG. 2 is a chart showing the sequence of operation of the system of FIG. 1.

DESCRIPTION OF A PREFERRED EMBODIMENT

Figure 1:
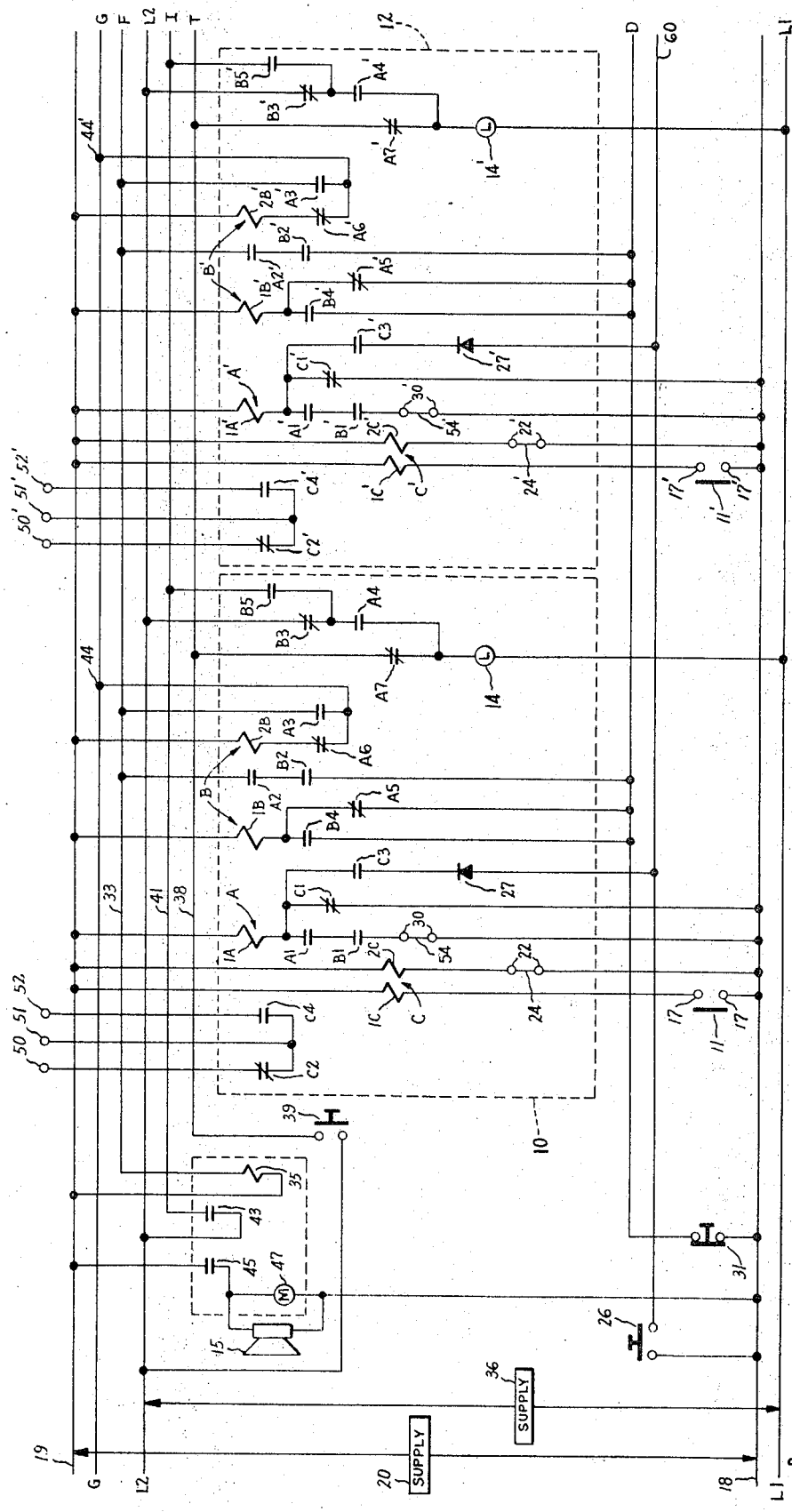
FIG. 1 is a circuit diagram showing an annunciator system comprising two basic modules embodying the invention and interconnected to permit a first and subsequent abnormal sequence indication.

Referring now to the drawing FIG. 1 shows a preferred embodiment of a basic annunicator module schematically illustrated by the broken line rectangle 10 and constructed in accordance with the invention. The module 10 functions to indicate the condition of an associated variable such as temperature, voltage, etc. and is responsive to a signal such as the condition of an alarm contact 11 having first and second conditions representative respectively of normal and abnormal conditions of the associated variable. One or more annunciator modules may be employed in association with one or more unrelated variables to function independently to indicate the condition of the associated variable, or a number of modules may be utilized in cooperating dependent relation each in association with one or a group of interrelated variables to provide a first and subsequent abnormal sequence indication. Interrelated variable comprise variables so related that a deviation from normal of one variable will very likely cause a subsequent deviation from normal of another variable. In such a case it is desirable to provide for identifying that variable which is the first to go off normal and also those variables which go off normal subsequent to the first off normal. In the specific embodiment illustrated in FIG. 1 the module 10 is interconnected with another similar module 12, each module being associated with a separate one of two interrelated variables to provide the sequence indication. Details of design of the module 10 will now be described.

In order to indicate the condition of an associated variable the module 10 includes suitable visual alarm means shown as comprising a single indicating light device 14 forming part of the module. The energization of the light device is controlled such that it is extinguished while the associated variable is in normal condition and is illuminated in response to the associated variable assuming an abnormal condition. The light device is preferably controlled so that it flashes in response to the occurrence of an abnormal condition of the associated variable. The device 14 may assume any suitable form, such as an incandescent lamp. In its preferred form the device 14 comprises an electroluminescent panel. The alarm means preferably includes an additional aubile alarm device shown in the form of a horn 15 which is external to the module and which is in common with a plurality of modules when such are employed. The horn 15 is controlled to be silent while a variable is in normal condition and to emit a sound when the variable assumes an abnormal condition.

In order to control operation of the light device 14 and the horn 15 the module 19 includes control means responsive to the condition of the associated alarm contact 11 for controlling energizing circuits for the light device and horn. In the embodiment illustrated the control means comprises a plurality of electromagnetic relays each having energizable winding means and a plurality of sets of contacts responsive to the condition of energization of the associated winding means. Three relays C, A, and B are employed, the relay C being controlled by the alarm contact 11 and in turn controlling the relay A which controls the relay B with both relays A and B controlling the light device 14 and the horn 15.

In accord with one aspect of the invention provision is made to permit selective use of the module 10 with either a normally open or a normally closed alarm contact. To this end the relay C includes two windings 1C and 2C having separate energizing circuit means adapted to be controlled respectively by a normally open alarm contact and a normally closed alarm contact. The windings 1C and 2C and their energizing circuit means are arranged so that when either type of alarm contact is employed, the windings 1C and 2C have conditions of energization resulting in the same first flux condition and the same first operating conditions of associated contacts when the selected alarm contact is in its normal condition, and the windings have conditions of energization resulting in the same second flux condition different from the first flux condition and the same second operating conditions of associated contacts different from the first operating conditions when the selected alarm contact is in its abnormal condition.

In the specific embodiment of the invention illustrated in FIG. 1, the energizing circuit means for windings 1C and 2C include a pair of spaced terminals 17 in series with the winding 1C with the series circuit connected across positive and negative power lines 18 and 19 connected to a suitable power supply 20. The energizing circuit means for the winding 2C includes a pair of spaced terminals 22 in series with the winding 2C with the series circuit connected across the power lines 18 and 19. The terminals 17 cooperate with a normally open alarm contact 11 whereas the terminals 22 cooperate with a normally closed alarm contact (not shown) when such is used instead of a normally open alarm contact. When a normally open alarm contact 11 is employed as shown, a suitable removable electroconductive link 24 is positioned to connect the terminals 22 in place of a normally closed alarm contact so that when the alarm contact 11 is in its normally open condition indicating a normal condition of the associated variable, the winding 1C is deenergized and the winding 2C is energized through the link 24. When tthe alarm contact 11 moves from its normal position shown to its abnormal position wherein it bridges the terminals 17 in response to an abnormal condition of the associated variable, the winding 1C is thereby energized so that both windings 1C and 2C are energized in response to the variable going off normal. The windings 1C and 2C are oppositely poled so as to produce a first magnetic flux condition when either one of the windings 1C and 2C alone is energized, and to produce a second substantially zero resultant magnetic flux condition when both windings 1C and 2C are simultaneously energized or are deenergized. When both windings are energized simultaneously, the magnetic fluxes produced thereby effectively cancel each other. Thus, when the normally open alarm contact 11 is in its normal condition, resulting energization of the winding 2C alone establishes the first flux condition, and when the normally open alarm contact 11 is in its abnormal condition, resulting energization of both windings 1C and 2C establishes the second flux condition.

If it is desired to use a normally closed alarm contact instead of a normally open alarm contact, the link 24 is replaced by a normally closed alarm contact (not shown) with the result that when the normally closed alarm contact is in its normal condition the winding 2C is energized and the winding 1C is deenergized thus producing the same first magnetic flux condition as when a normally open alarm contact is used and is in its normal condition. When a normally closed alarm contact is used and is moved to its abnormal open condition, the result is that both windings 1C and 2C are deenergized thus establishing the same second substantially zero resultant magnetic flux condition as when a normally open alarm contact is used and is moved to its abnormal closed condition.

In the following description contact sets of the relays C, A, and B are designated by the reference letter used to identify the relay followed by a numeral identification. The designations "normally open" and "normally closed" as applied in respect to contacts of the relays C and B refer to the conditions of the contacts when zero resultant magnetic flux is produced by the winding means of these relays. For example, normally closed contacts of relay C are closed when windings 1C and 2C ar both energized or deenergized. As applied to contacts of relay A, the designations "normally open" and "normally closed" refer to the conditions of the contacts when the associted winding is deenergized. In the drawing all contacts are shown in their normally open or closed conditions.

In order to effect certain controlling functions the relay C includes normally closed contact sets C1 and C2 and normally open contact sets C3 and C4 responsive to the magnetic flux conditions produced by windings 1C and 2C. A first energizing circuit for winding 1A of relay A includes the contacts C1 and the winding 1A in series across the power lines 18 and 19. A second energizing circuit for the winding 1A includes a manually operable normally open function test switch 26, a diode 27, the contacts C3, and the winding 1A in series across the power lines 18 and 19. The contacts C1 are connected in parallel circuit relation with the series connection of the switch 26, diode 27, and contacts C3. The contacts C2 and C4 are adapted for connection to user's external circuits as will be described hereinafter.

In order to effect certain controlling functions the relay A includes normally open contact sets A1, A2, A3, and A4 and normally closed contact sets A5, A6, and A7 responsive to magnetic flux conditions produced by winding 1A. The contacts A1 are included in an optional holding circuit for the winding 1A containing also normally open contacts B1 of relay B and spaced terminals 30, all in series across the power lines 18 and 19. The contacts A2 are included in a control circuit containing also a manually operable normally closed acknowledge switch 31, normally open contacts B2 of relay B, a portion 33 of a common bus F and a winding 35 of a flasher and horn relay, all in series across the power lines 18 and 19. The contacts A3, A5, and A6 are included in energizing circuit means for windings 1B and 2B of relay B as described hereinafter. The contacts A4 are included in a first energizing circuit for light device 14 containing also normally closed contacts B3 of relay B and the light device 14, all in series across additional power lines L1 and L2 connected to a power supply 36. The contacts A7 are included in a test circuit for light device 14 containing also a portion 38 of a common test bus T, a manually operable normally open light test switch 39, and light device 14, all in series across the power lines L1 and L2.

In order to effect certain controlling functions the relay B includes two windings 1B and 2B and a plurality of contact sets responsive to magnetic flux conditions produced by the windings. In accord with the invention the windings 1B and 2B are oppositely poled in the manner of the windings 1C and 2C of relay C. Accordingly, the windings 1B and 2B produce a first magnetic flux condition when either winding alone is energized, and produce a second substantially zero resultant magnetic flux condition when both windings are simultaneously energized or are deenergized. The relay B includes in addition to the previously mentioned contact sets B1, B2, and B3, two sets of normally open contacts B4 and B5. The contacts B4 are in parallel relation with the contacts A5, and the contacts B5 are included in a third energizing circuit for light device 14 containing in addition light device 14, contacts A4, a porton 41 of a common bus I and normally open motor operated contacts 43, all in series across the power lines L1 and L2. A grouping terminal 44 is shown connected in circuit with the winding 2B of relay B for connection to a grouping bus B.

In order to control the light device 14 and the horn 15 a flasher and horn relay is provided including normally open contacts 45 connected in series with the horn 15 with the series circuit across the power lines 18 and 19. A flashing motor 47 is connected in parallel relation with the horn 15 and is effective when energized to oscillate the contacts 43 between open and closed conditions to effect a flashing illumination of light device 14 when the contacts A4 and B5 are closed. The invention provides that the light device 14 and its energizing circuits are energizable from the power supply 36 independent of the power supply 20 thus increasing the flexibility of application of the module.

In accord with another feature of the invention provision is made for permitting the user of the module 10 to connect any desired circuits to terminals associated with the module 10 for producing informational or control functions in accord with the condition of the associated variable independently of the alarm means. To this end the contacts C2 of relay C are connected between a first terminal 50 and a common terminal 51, and the contacts C4 of relay C are connected between the common terminal 51 and a third terminal 52. With the described arrangement, the user may connect circuits to the terminals 50, 51, and 52 and such circuits will be established and interrupted in accord with the condition of the associated variable inasmuch as such circuits are controlled by relay C which in turn is controlled by the alarm contact.

According to a further aspect of the invention, provision is made for permitting a complete function test of the relays C, A and B, their energizing circuits, the light device 14 and the horn 15 and their energizing circuits when the associated variable is in its normal condition. Further, such a function test is performed without in any way disturbing the user's external circuits which may be connected to terminals 50, 51, and 52. To this end the winding 1A of the relay A includes a separate energizing circuit containing in series the function test switch 26 and the normally open contacts C3 of relay C which contacts are closed when the associated variable is in its normal condition to thereby permit energization of the winding 1A in response to closure of the switch 26 to perform a function test simulating an abnormal condition of the associated variable.

According to a further feature of the invention provision is made whereby the user by a simple converting operation can selectively provide a memory system wherein the winding 1A of relay A will remain energized subsequent to return of the alarm contact to its normal condition in response to a previously abnormal variable returning to its normal condition, or a non-memory system wherein winding 1A will be deenergized in response to return of the alarm contact to its normal condition. For this purpose the winding 1A includes an energizing circuit containing in series the contacts A1 and B1 and the spaced terminals 30 which when bridged by a suitable removable electroconductive link 54, provides a holding circuit for holding winding 1A energized after contacts C1 open to thereby provide a memory system. When the link 54 is removed, a non-memory system is provided in that winding 1A is deenergized in response to opening of contacts C1. This circuit may be termed an optional holding circuit.

Operation of the module 10 will now be described. Assume initially that a normally open alarm contact 11 is used and that it is in its illustrated normally open condition indicating that the associated variable is normal. Assume also that the grouping terminal 44 is disconnected from the grouping bus G. For these conditions, the winding 1C of relay C is deenergized whereas the winding 2C is energized through the link 24 which is employed when using a normally open alarm contact. Windings 1C and 2C therefore produce the first flux condition so that contacts C1 and C2 are open, and contacts C3 and C4 are closed. The winding 1A of relay A is thus deenergized so that contacts A1, A2, A3 and A4 are open and contacts A5, A6 and A7 are closed as shown in FIG. 1. Winding 1B alone of relay B is energized through closed contacts A5 so that normally open contacts B1, B2, B4 and B5 are closed and the normally closed contacts B3 are open. Winding 2B of relay B is deenergized as is the winding 35 of the flasher and horn relay because contacts A2 and A3 are open. The light device 14 is extinguished and the horn 15 is silent because contacts A4 and A5 are open. A function test may be performed under these conditions because contacts C3 are closed. A separate test of the light device may also be performed since contacts A7 are closed.

Assume now that the normally open alarm contact 11 moves to its closed condition wherein it bridges terminals 17 thereby indicating that the associated variable has gone off normal. This results in energization of winding 1C of relay C so that both windings 1C and 2C are now energized to provide the second substantially zero resultant magnetic flux condition. This results in closure of contacts C1 to energize winding 1A of relay A, opening of contacts C3 to prevent a function test, and closure of contacts C2 and opening of contacts C4 to change the condition of external circuits which might be connected to the terminals 50, 51 and 52. Energization of winding 1A of relay A causes closure of its normally open contacts A1, A2, A3 and A4 and opening of its normally closed contacts A5, A6 and A7. Closure of contacts A1 establishes the optional holding circuit for winding 1A if the link 54 is employed since contacts B1 are closed. Closure of contacts A2 results in energization of winding 35 of the flasher and horn relay through closed contacts A2 and B2 to thereby close contacts 45 and energize the horn 15 and the motor 47. The horn 15 emits an audible sound and the motor 47 causes the contacts 43 to oscillate between open and closed conditions. Closure of contacts A3 and opening of contacts A6 in the energizing circuit for winding 2B of relay B has no affect and results in continued deenergization of winding 2B. Closure of contacts A4 results in energization of the light device 14 through closed contacts B5 and the oscillating contacts 43 resulting in flashing of the light. Opening of contacts A5 results in continued energization of winding 1B through closed contacts B4 and the closed acknowledge switch 31. Opening of contacts A7 prevents the performance of a test for the light device 14.

At this time the horn 15 is sounding and the light device 14 is flashing to thus alert an operator that associated variable has gone off normal. If the link 54 is employed, the holding circuit for maintaining energization of winding 1A is established so that such winding will remain energized to flash the light and sound the horn even through the variable has previously returned to normal and winding 1C is deenergized and its contacts C1 are open. If the link 54 is omitted, the winding 1A will be deenergized in response to the variable returning to normal which will result in silencing of the horn and extinguishment of the light. However, as long as the variable remains abnormal the winding 1A will remain energized through closed contacts C1 whether or not the link 54 is employed.

In order to silence the horn and to change the light indication the operator actuates the acknowledge switch 31 to open position which interrupts the energizing circuit for winding 1B to deenergize such winding. The acknowledge switch may be of the spring return type and when it is released by the operator and returns to its closed position, the winding 1B cannot be reenergized because contacts A5 are open and contacts B4 opened when winding 1B was deenergized by opening of the acknowledge switch. Deenergization of winding 1B results in both windings 1B and 2B being deenergized so that contacts 1B open to interrupt the holding circuit if the link 54 is used so that winding 1A will be deenergized in response to the variable returning to normal subsequent to acknowledgement. Deenergization of winding 1B also opens contacts B2 to effect deenergization of winding 35 of the flasher and horn relay to open contacts 45 for silencing the horn and deenergizing the motor 47. Finally, deenergization of winding 1B closes contacts B3 and opens contacts B5 whereby the light device 14 is now energized so as to provide a steady illumination.

Assuming that the link 54 is employed in the holding circuit for winding 1A and also that prior to acknowledgement the abnormal variable had returned to normal, then opening of the acknowledge switch 31 results in extinguishment of the light. This is explained by considering that opening of the acknowledge switch results in opening of contacts B1 to effect deenergization of winding 1A, contacts C1 having previously been opened in response to the variable returning to normal. Deenergization of winding 1A opens contacts A4 which deenergizes the light device 14. If after acknowledgement the light device assumes a steady illumination such indicates that the variable is still abnormal and the light device will remain in such condition as long as the variable is abnormal. When the variable returns to normal, the light will be automatically extinguished due to opening of contacts A4 resulting from deenergization of windings 1C and 1A in response to opening of the normally open alarm contact. Deenergization of winding 1A also results in energization of winding 1B to thus cause all elements of the module to assume their initial conditions prevailing when the associated variable is normal.

A plurality of modules identical to the module 10 may be employed in association with a group of variables and when so employed, the modules have in common certain switches and circuits. The function test switch 26 is connected to each of the modules through a common bus 60 and the acknowledge switch 31 is connected to each of the modules through a common bus D. Also, the winding 35 of the flasher and horn relay is connected to each of the modules through the common bus F and the light test switch 39 is connected to each module through the common bus T. When a number of modules are used with a number of unrelated variables, the modules operate independently in the manner previously described. Actuation of the function test switch 26 will under normal operating conditions cause sounding of the horn and flashing of the light devices in those modules associated with variables which are in normal conditions.

In accord with the invention a number of modules identical to the module 10 may be grouped together in association with a group of interrelated variables to provide a first and subsequent off normal sequence indicating system. The grouping together of the modules is conveniently accomplished by the user by simply interconnecting the grouping terminals of the modules. The grouping terminal 44 of the module 10 is connected to a point between the contacts A3 and A6 in the energizing circuit for the winding 2B of relay B and is shown connected to a like grouping terminal 44' of the module 12 by a grouping bus G. The modules 10 and 12 are identical and like elements therein are represented by the same reference characters with a prime added to the reference characters associated with the elements of the module 12. The sequence of operation of the sequence indicating system of FIG. 1 is depicted by the chart of FIG. 2 wherein the letters D and E denote respectively deenergized and energized conditions of the identified relay windings.

Assume initially that the variable associated with the module 10 is the first of the group of interrelated variables to become abnormal. When this occurs, the module 10 functions precisely as previously described so that the horn 15 sounds and the light 14 flashes. It will be recalled that when the winding 1A of relay A is energized in response to the associated variable going off normal, the contacts A3 and A6 respectively assume closed and open conditions. Opening of contacts A6 disconnects the winding 2B from the grouping terminal 44. Closure of contacts A3 establishes an energizing circuit for the winding 2B' of the relay B' in module 12 which may be traced from the power line 18 to the acknowledge switch 31, closed contacts B2 and A2, the bus F, closed contacts A3, grouping terminal 44, the grouping bus G, grouping terminal 44', contacts A6' which are closed at this time in the module 12, and the winding 2B' to the power line 19. As a result, in the module 12 both windings 1B' and 2B' of the relay B' are energized to establish the second substantially zero resultant magnetic flux condition. Such second magnetic flux condition causes the normally open contacts B1', B2', B4' and B5' to assume their normally open conditions and the normally closed contacts B3' to assume their normally closed condition.

Assume now that the variable associated with module 12 goes off normal subsequent to the time that the variable associated with the module 10 went off normal. This will result in closure of normally open alarm contact 11' and energization of windings 1C' and 1A' in the module 12 in the manner described in connection with module 10. Energization of winding 1A' closes contacts A1', A2', A3' and A4', opens contacts A5' to deenergize winding 1B' since contacts B4' are now open, opens contacts A6' to deenergize winding 2B' so that both windings 1B' and 2B' are now deenergized, and opens contacts A7'. Accordingly, since both windings 1B' and 2B' are now deenergized, they produce zero resultant magnetic flux which is the same second substantially zero resultant magnetic flux condition which these windings produced when both were simultaneously energized prior to the variable subsequently going off normal. Inasmuch as contacts A4' and B3' are now closed, the light device 14' is energized to provide a steady illumination distinguishing it from the flashing indication of the light device in the module 10. By virtue of the different light indications the operator is advised as to which variable was the first to go off normal and which variable went off normal subsequent to the first off normal and can note the sequence and locations of the various off normal conditions prior to acknowledgement.

In order to acknowledge the first and subsequent off normal alarm indications the operator opens the acknowledge switch 31 which, if the first to go abnormal variable is still abnormal, results in deenergization of the winding 1B causing silencing of the horn and steady illumination of the light device 14 in the manner previously described in connection with the module 10. If the variable associated with module 12 is still abnormal at the time of acknowledgement, opening of the acknowledge switch has no effect upon the circuits of module 12 inasmuch as the winding 1B' is deenergized at the time of acknowledgement. Accordingly, after acknowledgement the light devices 14 and 14' are both in a steady illuminated condition. When the variables associated with the modules 10 and 12 return to normal, the light devices 14 and 14' are automatically deenergized and thus extinguished.

During the time the variables associated with the modules 10 and 12 are in their normal conditions, a function test of the entire system may be performed by closing the function test switch 26. If this results in simultaneous energization of windings 1A and 1A', then the horn will sound and the light devices 14 and 14' both will flash. However, if this results in energization of one of the windings 1A and 1A' signifiantly in advance of the other of such windings, then a function test of the sequence operation will occur.

Figure 3:
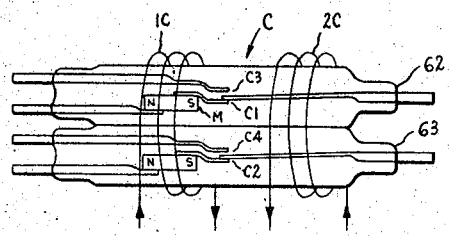
FIGS. 3, 4, and 5 are schematic representaitons showing respectively the relays C, A, and B employed in each of the modules of FIG. 1.

Although the relays C, A and B may be of any suitable construction, they preferably comprise reed switch relays. Referring to FIG. 3 the relay C is illustrated as comprising a plurality of reed switches each including a plurality of magnetically responsive contacts within a sealed capsule surrounded by the oppositely poled windings 1C and 2C which produce when simultaneously energized magnetic fluxes which essentially cancel. The relay C includes a pair of identical double throw reed switches 62 and 63 including respectively sets of normally closed and normally open contacts C1 and C3 and sets of normally closed and normally open contacts C2 and C4 thereby providing the four contact sets of relay C. While any suitable type of double throw reed switch may be employed, it is preferred that the reed switches 62 and 63 comprise the design disclosed in U.S. Pat. No. 3,117,202.

In accord with U.S. Pat. 3,117,202 the relay 62 for example has a reed removable between two fixed contacts and a bias magnet M poled as shown biases the reed so that contacts C1 and C3 are respectively normally closed and normally open. When winding 2C alone is energized by current flow in the direction indicated by the associated arrows, as it normally is through either the link 24 or a normally closed alarm contact, the flux so generated overcomes the bias magnet flux so that the reed snaps up to open contacts C1 and close contacts C3. When winding 1C is energized in response to closure of normally open alarm contact 11, current flows therethrough in the direction of the associated arrows to produce a flux which cancels the flux produced by winding 2C to establish the second substantially zero resultant flux condition. This results in the reed being attracted down by magnet M to close contacts C1 and open contacts C3. The switch 63 operates in the same manner.

Figure 4:
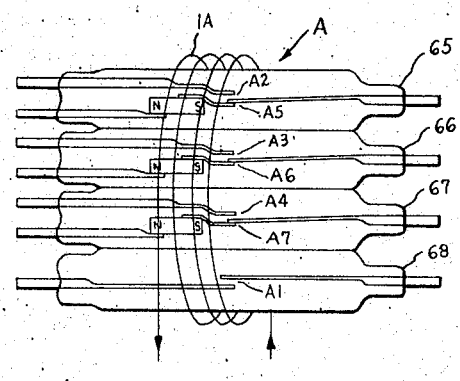

FIG. 4 illustrates relay A in the form of a reed switch relay. The relay A includes seven contact sets comprised of four normally open contact sets and three normally closed contact sets. As shown in FIG. 4 these contact sets are provided by three identical double throw reed switches 65, 66 and 67 identical to switches 62 and 63 and a single throw reed switch 68 which may comprise the design disclosed in U.S. Pat. 2,289,830, all surrounded by the single winding 1A. Thus, the switch 65 contains normally open and closed contacts A2 and A5, the switch 66 contains normally open and closed contacts A3 and A6, the switch 67 contains normally open and closed contacts A4 and A7, and the switch 68 contains normally open contacts A1.

Figure 5:
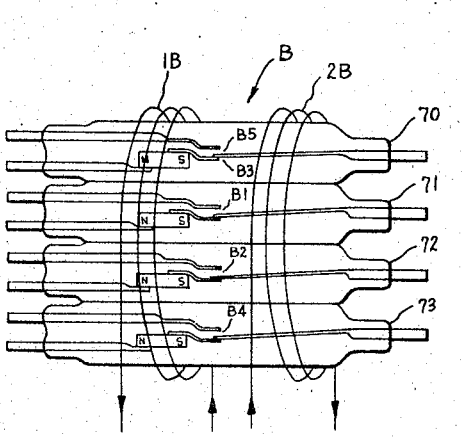

FIG. 5 illustrates the relay B in the form of a reed switch relay comprising four double throw reed switches 70, 71, 72 and 73 identical to switches 62 and 63 and forming the one normally closed and four normally open contact sets of relay B. Switch 70 contains the normally closed and open contacts B3 and B5, and the switches 71, 72 and 73 contain respectively the normally open contacts B1, B2 and B4. The normally closed contacts of switches 71, 72 and 73 are not used. The four switches are surrounded by the oppositely poled windings 1B and 2B which when energized have current flowing therethrough in the directions indicated by the associated arrows.

Although the invention has been described with reference to certain specific embodiments thereof, numerous modifications are possible and it is desired to cover all modifications falling within the spirit and scope of the invention.

What I claim as new and desire to secure by Letters Patent of the United States is:

I claim:

1. A control circuit adapted for selective operation with either a normally open or a normally closed alarm contact having first and second conditions representative respectively of normal and abnormal conditions of a variable comprising in combination:

first spaced terminals for association with a normally open alarm contact, second spaced terminals for association with a normally closed alarm contact, said second terminals being adapted for connection by a removable electroconductive connecting link which is positioned to connect said second terminals when said first terminals are associated with a normally open alarm contact, a relay including first and second windings and contact means, said first and second windings being arranged to produce a first magnetic flux condition when either winding alone is energized, and a second substantially zero resultant magnetic flux condition when both windings are simultaneously energized or are deenergized, said contact means having a first operating condition for said first flux condition and having a second different operating condition for said second flux condition, said first and second terminals being connected respectively to said first and second windings such that when said first terminals are associated with a normally open alarm contact and said second terminals are connected by said link, said first and second windings have conditions of energization to produce one of said flux conditions while said normally open alarm contact is open, and to produce the other of said flux conditions in response to closure of said normally open contact, and when said second terminals are associated with a normally closed alarm contact in place of said link, said first and second windings have conditions of energization to produce said one of said flux conditions while said normally closed alarm contact is closed, and to produce said other flux condition in response to opening of said normally closed alarm contact, and means controlled by said contact means.

2. A circuit as defined in claim 1 wherein said last-named means includes a control relay having two oppositely poled windings and a plurality of contacts, and energizing circuit means for one of said windings of said control relay including a grouping terminal adapted for connection to a like grouping terminal of another like control circuit.

3. A circuit as defined in claim 1 wherein said contact means includes contacts which are closed when said alarm contact is in its first normal condition and which open when said alarm contact transfers to its second abnormal condition, said last-named means including a control relay, and an energizing circuit for said control relay including a manually operable normally open function test switch and said contacts in series, whereby closure of said function test switch when said alarm contact is in its first normal condition permits a function test of said control relay.

4. A circuit as defined in claim 1 wherein said last-named means includes alarm means and relay means controlling said alarm means, said contact means comprising first contacts controlling said relay means and second contacts for connection to external circuits to permit indication of the condition of the alarm contact independently of said alarm means.

5. A circuit as defined in claim 1 wherein said relay comprises a reed switch relay having said contact means within a sealed capsule, said first and second windings surrounding said capsule and being oppositely poled.

6. A circuit as defined in claim 1 wherein said contact means includes first contacts which are open when said alarm contact is in its first normal condition and which are closed when said alarm contact is transferred to its second abnormal condition, said last-named means including a second relay having a winding and a plurality of contacts, a third relay having a winding and a plurality of contacts, energizing circuit means for said winding of said second relay including said first contacts whereby said winding of said second relay is energized in response to closure of said first contacts resulting from transfer of said alarm contact from its first normal condition to its second abnormal condition, energizing circuit means for said winding of said third relay including normally open contacts of said third relay and normally closed contacts of said second relay in shunt relation, alarm means, and energizing circuit means for said alarm means including contacts of each of said second and third relays.

7. A circuit as defined in claim 6 wherein the energizing circuit means for said winding of said second relay includes an optional holding circuit containing third spaced terminals, normally open contacts of said second relay, and normally open contacts of said third relay all in series with one another and in shunt relation with said first contacts, said third spaced terminals being adapted for connection by a removable electroconductive jumper to provide a holding circuit for maintaining energization of the winding of said second relay when said first contacts subsequently open in response to said alarm contact transferring to its first normal condition from its second abnormal condition.

8. An annunciator circuit responsive to a signal having first and second conditions representative respectively of different conditions of a variable comprising in combination:
- a first relay having winding means and first contacts,
- energizing circuit means for the winding means of said first relay including terminals to which said signal is applied,
- said first contacts of said first relay being closed in response to a predetermined condition of energization of the winding means of said first relay resulting from transfer of said signal from its first condition to its second condition,
- a second relay having a winding and a plurality of contacts,
- energizing circuit means for the winding of said second relay including the first contacts of said first relay,
- a third relay having first and second windings and a plurality of contacts, the windings of said third relay being arranged to produce a first magnetic flux condition when either winding alone is energized, and a second substantially zero resultant magnetic flux condition when both windings are simultaneously energized or are deenergized.
- energizing circuit means for the first winding of said third relay including normally open first contacts of said third relay which are closed in response to said first magnetic flux condition, and normally closed first contacts of said second relay in shunt relation with said normally open first contacts of said third relay, the normally closed first contacts of said second relay being opened in response to energization of the winding of said second relay,
- energizing circuit means for the second winding of said third relay including normally open second contacts of said second relay and normally closed third contacts of said second relay in series, and means for connecting a grouping terminal to a point between said second and third contacts of said second relay,
- alarm means, and
- energizing circuit means for said alarm means including other contacts of each of said second and third relays.

9. A circuit as defined in claim 8 wherein said first relay includes a plurality of additional contacts for connection to external circuits to permit indication of the condition of the variable independently of said alarm means.

10. A circuit as defined in claim 8 wherein said first relay includes second contacts which are closed when said signal is in its first condition and which open in response to transfer of said signal from its first condition to its second condition,
- a manually operable normally open function test switch, and
- said energizing circuit means for the winding of said second relay including an energizing circuit containing said second contacts of said first relay and said function test switch in series with each other and in shunt relation with the first contacts of said first relay, whereby closing of said function test switch when said signal is in its first condition permits a function test of said second relay, said third relay, and said alarm means.

11. A circuit as defined in claim 8 wherein the energizing circuit means for the winding of said second relay includes an optional holding circuit containing second spaced terminals, normally open fourth contacts of said second relay, and normally open second contacts of said third relay all in series with one another and in shunt relation with the first contacts of said first relay, said second terminals being adapted for connection by a removable electroconductive jumper to provide a holding circuit for maintaining energization of the winding of said second relay when said first contacts of said first relay subsequently open in response to said signal transferring to its first condition from its second condition.

12. A circuit as defined in claim 8 wherein said alarm mean includes an indicating light device and an audible horn,
- said energizing circuit means for said alarm means including a first energizing circuit for said light device containing normally open contacts of said second relay and normally closed contacts of said third relay in series to effect steady illumination of said light device, a second energizing circuit for said light device containing normally open contacts of said second relay and normally open contacts of said third relay in series with means to effect flashing illumination of said light device, and a third energizing circuit for said horn containing normally open contacts of said second relay and normally open contacts of said third relay in series, and
- a manually operable normally closed acknowledge switch included in the energizing circuit for the first winding of said third relay.

13. A circuit as defined in claim 8 wherein said first, second and third relays each comprises a reed switch relay having contacts within sealed capsule means surrounded by winding means, the first and second windings of said third relay being oppositely poled.

14. A circuit as defined in claim 10 wherein said alarm mean includes an indicating light device and an audible horn,
- said energizing circuit means for said alarm means including a first energizing circuit for said light device contaning normally open contacts of said second relay and normally closed contacts of said third relay in series to effect steady illumination of said light device, a second energizing circuit for said light device containing normally open contacts of said second relay and normally open contacts of said third relay in series with means to effect flashing illumination of said light device, and a third energizing circuit for said horn containing normally open contacts of said second relay and normally open contacts of said third relay in series, and
- a manually operable normally closed acknowledge switch included in the energizing circuit for the first winding of said third relay.

15. An annunciator system for indicating the presence of abnormal variables in a group of interrelated variables comprising in combination:
- a plurality of annunciator modules each for association with a separate variable of said group, each module being responsive to an alarm contact having first and second conditions representative respectively of normal and abnormal conditions of the associated variable,
- each module including a relay having first and second winding means and a plurality of contacts, the winding means of said relay being arranged to produce a first magnetic flux condition when either winding means alone is energized, and a second substantially zero resultant magnetic flux condition when both winding means are simultaneously energized or are deenergized,
- each module including a grouping terminal connected in circuit with the second winding means of said relay,
- grouping terminal connection means interconnecting the grouping terminals of said modules,
- control means for establishing one of said first and second flux conditions of the winding means of the relay in the module associated with a variable which is the first to become abnormal in response to said first to become abnormal condition, and for establishing the other of said first and second flux conditions of the winding means of the relays in the modules associated with variables which become abnormal subsequent to said first to become abnormal in response to said subsequent abnormal conditions, each module including alarm means actuatable to provide first and second different alarm indications, and means including contacts of said relay for actuating said alarm means to provide said first alarm indication when said first flux condition is produced by the winding means of the associated relay, and to provide said second alarm indication when said second flux condition is produced by the winding means of the associated relay.

16. A system as defined in claim 15 wherein said control means includes a second relay in each module having winding means and first and second contacts which respectively are open and closed when the alarm contact is in its first normal condition and which respectively close and open when the alarm contact transfers to its second abnormal condition, a third relay in each module having a winding and contacts, energizing circuit means for the winding of said third relay including said first contacts, and a manually operable normally open function test switch common to all said modules, said energizing circuit means for the winding of said third relay including an energizing circuit independent of the first contacts of said third relay and containing in series said second contacts of said third relay and said function test switch.

17. A system as defined in claim 15 wherein said control means includes a second relay in each module including first and second winding means and a plurality of contacts, said first and second winding means of said second relay being arranged to produce a first magnetic flux condition when either winding means alone is energized, and a second substantially zero resultant magnetic flux condition when both winding means are simultaneously energized or are deenergized, first spaced terminals in each module for association with a normally open alarm contact, second spaced terminals in each module for association with a normally closed alarm contact, said second terminals being adapted for connection by a removable electroconductive connecting link which is positioned to connect said second terminals when said first terminals are associated with a normally open alarm contact, and energizing circuit means for the winding means of said second relay comprising a first energizing circuit including the first winding means of said second relay and said first terminals in series, and a second energizing circuit including the second winding means of said second relay and said second terminals in series, whereby when said first terminals are associated with a normally open alarm contact and said second terminals are connected by said link, said first and second winding means of said second relay are energized simultaneously in response to closure of said normally open alarm contact to produce said second magnetic flux condition, and when said second terminals are associated with a normally closed alarm contact in place of said link, said first and second winding means are deenergized in response to opening of said normally closed alarm contact to also produce said second magnetic flux condition.

18. A system as defined in claim 15 including a manually operable normally closed acknowledge switch common to all said modules and connected in circuit with said first winding means of each of said relays.

19. A system as defined in claim 15 wherein said one of said flux conditions is said first flux condition produced by energization of said first winding means alone, and said other flux condition is said second flux condition produced by deenergization of both said first and second winding means.

20. An annunciator module responsive to a signal having first and second conditions representnative of different conditions of a variable comprising in combination;

a first relay having a winding and a plurality of contacts, means responsive to transfer of said signal from its first condition to its second condition for changing the condition of energization of the winding of said first relay, a second relay having first and second windings and a plurality of contacts, said first and second windings of said second relay being arranged to produce a first magnetic flux condition when either winding alone is energized, and a second substantially zero resultant magnetic flux condition when both windings are simultaneously energized or are deenergized, energizing circuit means for the first winding of said second relay including first contacts of said second relay which are closed for said first flux condition and which are open for said second flux condition, and first contacts of said first relay in shunt relation with said first contacts of said second relay, the first contacts of said first relay being opened in response to said change in the condition of energization of the winding of said first relay, energizing circuit means for the second winding of said second relay including in series second and third contacts of said first relay having opposite operating conditions at any given time, alarm means, and energizing circuit means for said alarm means including contacts of each of said first and second relays.

21. A module as defined in claim 20 including a manually operable normally open function test switch, and means for effecting energization of the winding of said first relay in response to closure of said function test switch when said signal is in its first condition to permit a function test of said first and second relays and said alarm means.

22. A module as defined in claim 20 wherein said alarm means includes a single indicating light device.

said energizing circuit means for said alarm means including a first energizing circuit for said light device containing normally open contacts of said first relay and normally closed contacts of said second relay in series to effect steady illumination of said light device, a second energizing circuit for said light device containing normally open contacts of said first relay and normally open contacts of said second relay in series with means to effect flashing illumination of said light device, and a manually operable normally closed acknowledge switch included in the energizing circuit for the first winding of said second relay.

23. A module as defined in claim 20 wherein said second relay comprises a reed switch relay having contacts within a sealed capsule, said first and second windings surrounding said capsule and being oppositely poled.

24. A module as defined in claim 21 wherein said alarm means includes a single indicating light device, said energizing circuit means for said alarm means including a first energizing circuit for said light device containing normally open contacts of said first relay and normally closed contacts of said second relay in series to effect steady illumination of said light device, a second energizing circuit for said light device containing normally open contacts of said first relay and normally open contacts of said second relay in series with means to effect flashing illumination of said light device, and a manually operable normally closed acknowledge switch included in the energizing circuit for the first winding of said second relay.

25. A control circuit adapted for selective operation with either a normally open or a normally closed alarm contact having first and second conditions representative respectively of normal and abnormal conditions of a variable comprising in combination:

first spaced terminals for association with a normally open alarm contact, second spaced terminals for association with a normally closed alarm contact, said second terminals being adapted for connection by a removable electroconductive connecting link which is positioned to connect said second terminals when said first terminals are associated with a normally open alarm contact, a relay including first and second windings and contact means, said first and second windings being arranged to produce a first magnetic flux condition when either winding alone is energized, and a second substantially zero resultant magnetic flux condition when both windings are simultaneously energized or are deenergized, said contact means having a first operating condition for said first flux condition and having a second different operating condition for said second flux condition, said first and second terminals being connected respectively to said first and second windings such that when said first terminals are associated with a normally open alarm contact and said second terminals are connected by said link, said second winding alone is energized to produce said first flux condition while said normally open alarm contact is open, and both said first and second windings are energized to produce said second flux condition in response to closure of said normally open contact, and when said second terminals are associated with a normally closed alarm contact in place of said link, said second winding alone is energized to produce said first flux condition while said normally closed alarm contact is closed, and both said first and second windings are deenergized to produce said second flux condition in response to opening of said normally closed alarm contact, and means controlled by said contact means.

References Cited

UNITED STATES PATENTS

| | | | |
|---|---|---|---|
| 2,701,872 | 2/1955 | Marmorstone | 340—415 X |
| 3,128,457 | 4/1964 | Culbertson | 340—213.1 |
| 3,256,404 | 6/1966 | Newman et al. | 335—180 X |

THOMAS B. HABECKER, Primary Examiner

C. M. MARMELSTEIN, Assistant Examiner

U.S. Cl. X.R.

340—214, 415